United States Patent [19]

Kobayashi

[11] Patent Number: 5,630,192
[45] Date of Patent: May 13, 1997

[54] PHOTOGRAPHIC CAMERA

[75] Inventor: Kiyotaka Kobayashi, Saitama-ken, Japan

[73] Assignee: Fuji Photo Film Co., Ltd., Kanagawa, Japan

[21] Appl. No.: 398,520

[22] Filed: Mar. 3, 1995

[30] Foreign Application Priority Data

Mar. 4, 1994 [JP] Japan .................................. 6-034715
May 13, 1994 [JP] Japan .................................. 6-099909

[51] Int. Cl.$^6$ .............................. G03B 1/04; G03B 17/02; G03B 17/26
[52] U.S. Cl. ........................... 396/513; 396/516; 396/538
[58] Field of Search ......................... 354/173.1, 174, 354/275, 277, 288; 396/513, 516, 538, 405, 413, 418

[56] References Cited

U.S. PATENT DOCUMENTS

| 5,115,268 | 5/1992 | Kitagawa et al. | 354/275 |
| 5,200,777 | 4/1993 | Zander | 354/275 |
| 5,231,438 | 7/1993 | Smart | 354/281 |
| 5,319,406 | 6/1994 | Takatori et al. | 354/275 |
| 5,319,407 | 6/1994 | DiRisio | 354/275 |
| 5,359,378 | 10/1994 | Zander et al. | 354/275 |
| 5,432,575 | 7/1995 | Funahashi | 354/288 |
| 5,481,325 | 1/1996 | Wada et al. | 354/173.1 |
| 5,495,310 | 2/1996 | Takatori | 354/288 |

*Primary Examiner*—A. A. Mathews
*Attorney, Agent, or Firm*—Sughrue, Mion, Zinn, Macpeak & Seas

[57] ABSTRACT

A photographic camera has a magazine chamber which is opened and closed by a light-shielding lid. A film magazine which has a magazine body provided with a film exit slit and a light-shielding door for opening and closing the film exit slit is loaded in the magazine chamber. A light-shielding door opening and closing mechanism opens and closes the light-shielding door of the film magazine loaded in the magazine chamber. An electric motor is disposed in the camera and provides the light-shielding door opening and closing mechanism with driving force for opening and closing the light-shielding door. A controller causes the light-shielding door opening and closing mechanism to open and close the light-shielding door under the driving force provided by the electric motor when the light-shielding lid is closed.

18 Claims, 16 Drawing Sheets

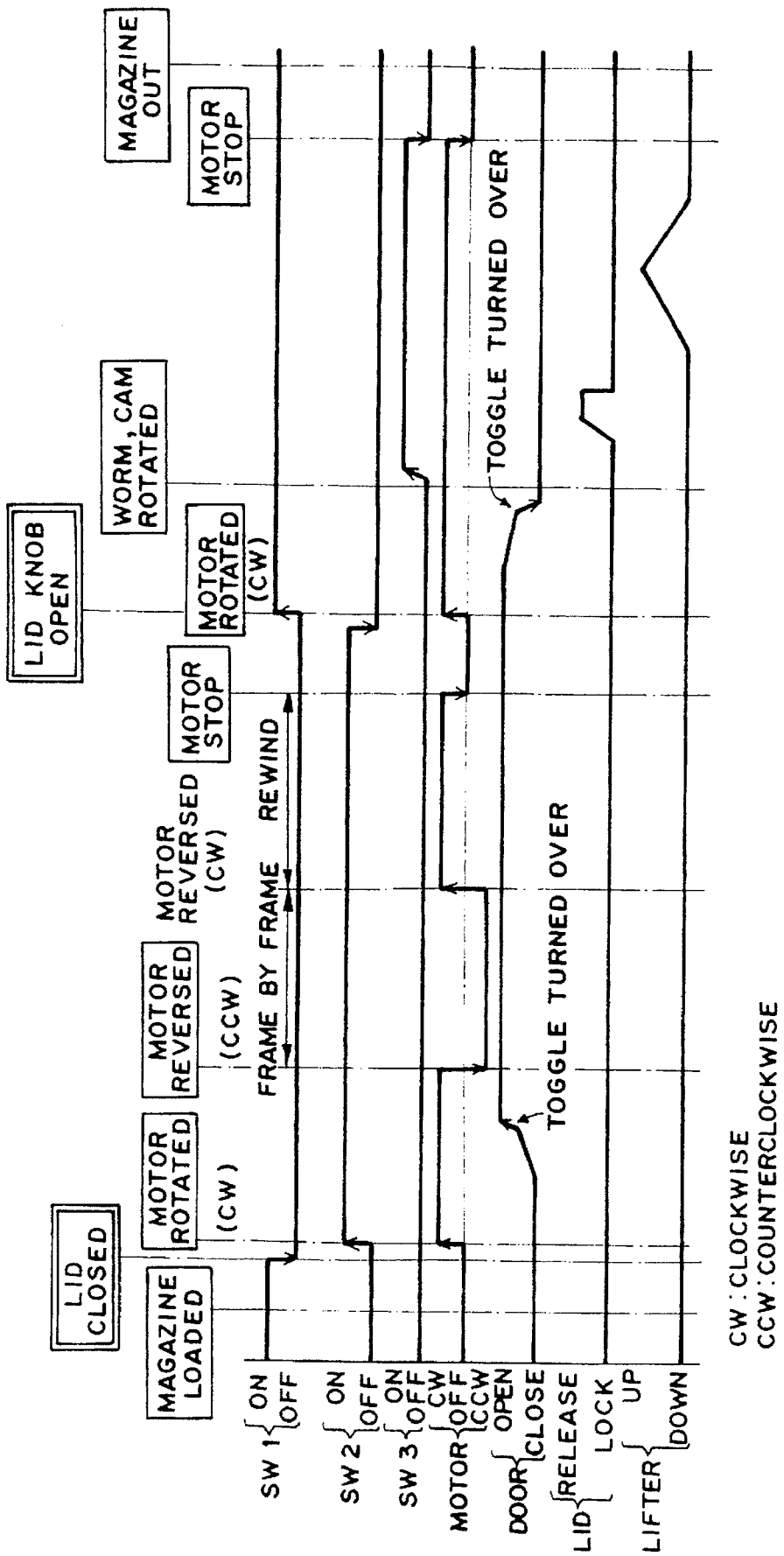

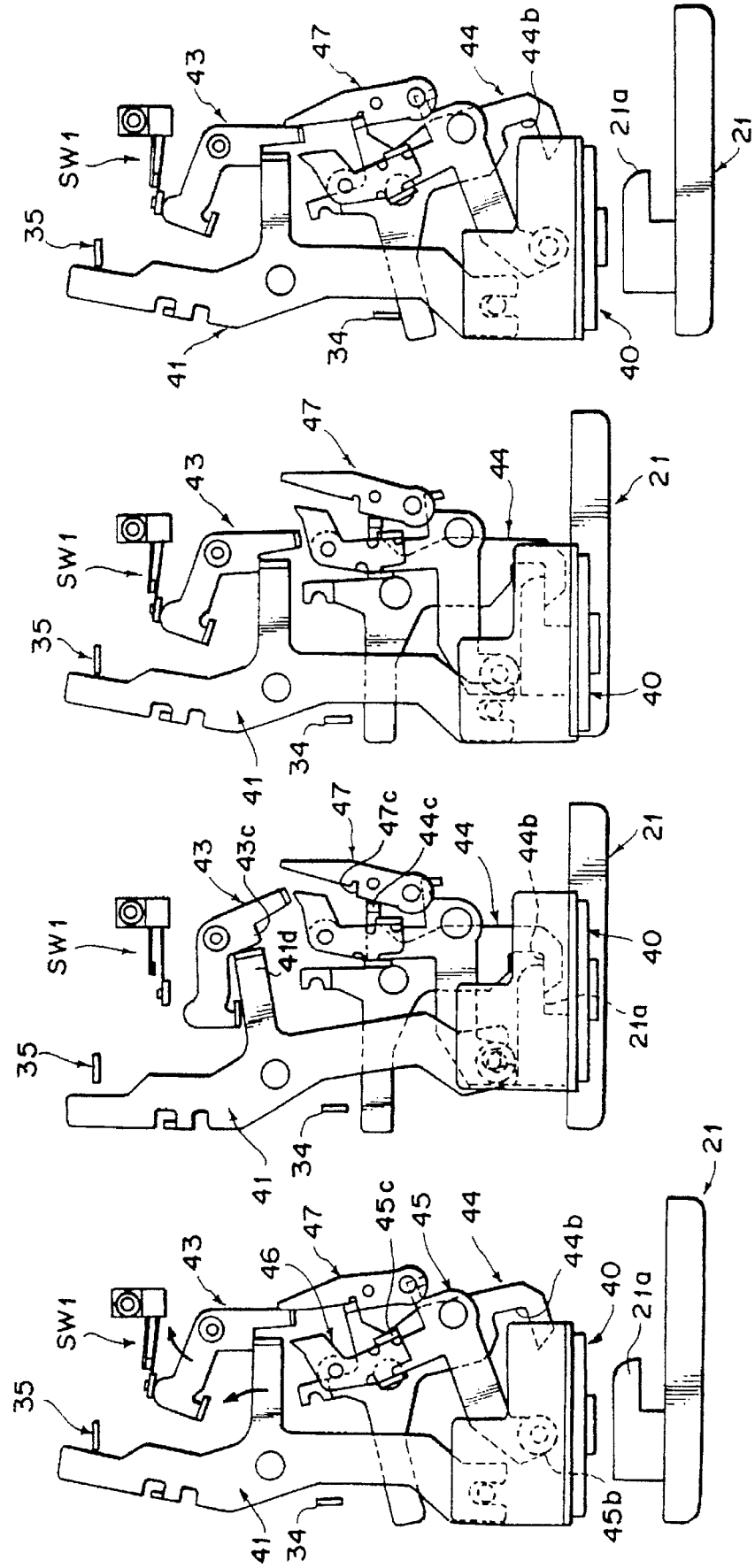

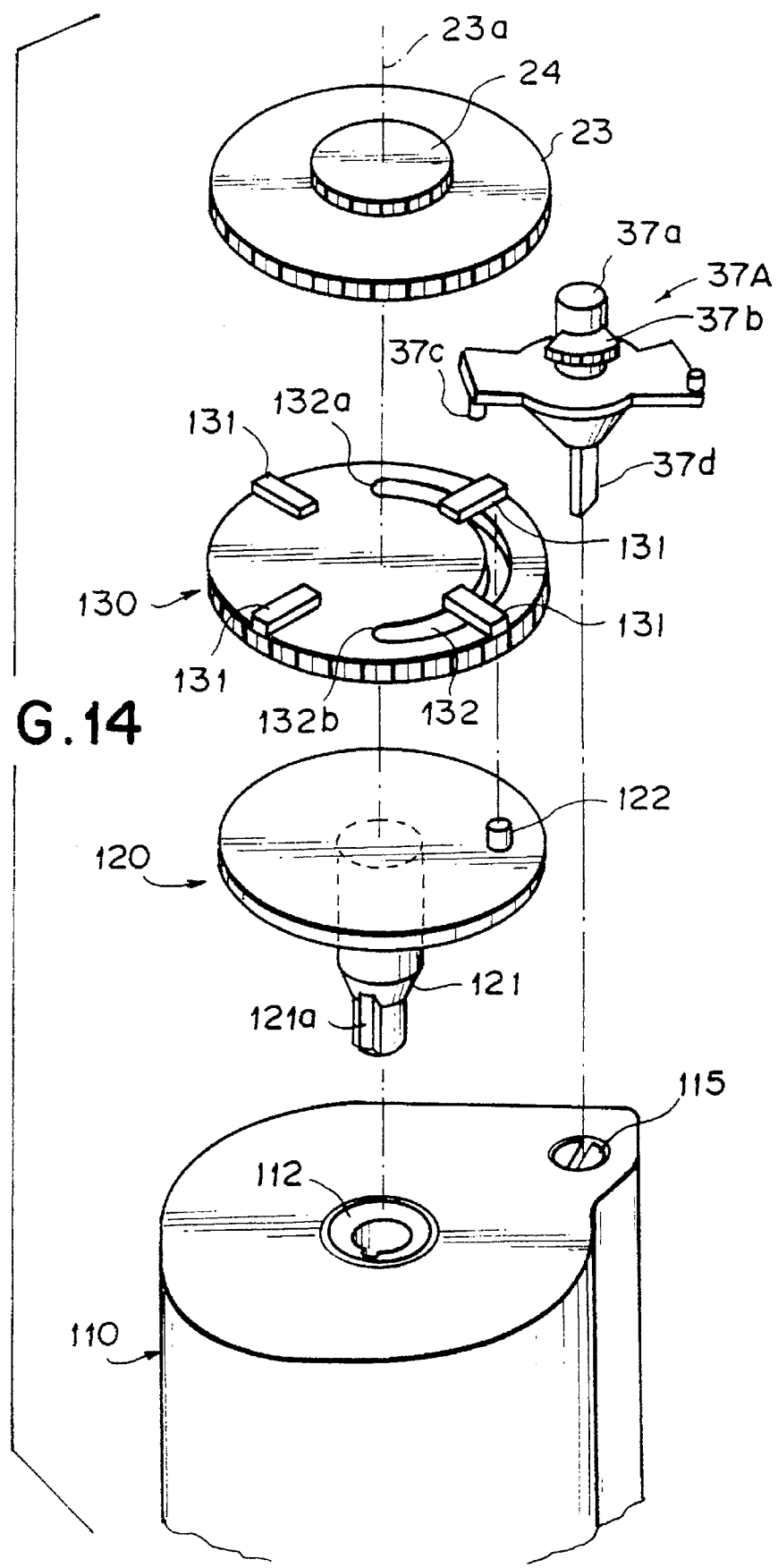

PHOTOGRAPHIC CAMERA

BACKGROUND OF THE INVENTION

1. Field of the Invention

This invention relates to a photographic camera using a film magazine having a light-shielding door for opening and closing a film exit slit, and more particularly to an improvement in the mechanism for opening and closing the light-shielding door.

2. Description of the Prior Art

Recently there has been proposed a film magazine comprising a magazine body having film exit slit and a light-shielding door for opening and closing the film exit slit. Generally such a film magazine is provided with a film spool which is supported for rotation in the magazine body and around which a roll film is wound. When the light-shielding door is closed, the whole roll film is accommodated in the magazine body in a light-tight fashion and when the spool is rotated while the light-shielding door is opened, the film is wound into or off the magazine body.

In a photographic camera using such a film magazine, a mechanism for opening and closing the light-shielding door (simply referred to as "door opening mechanism herein) is required and the door opening mechanism must be actuated in response to closure of a light-shielding lid of the camera.

Though the door opening mechanism may be actuated by manually operating an actuator provided on the camera body, such an additional operation is inconvenient to the users who are accustomed to cameras using conventional film magazines without light-shielding door.

In U.S. Pat. No. 5,231,438, there is disclosed a camera in which the door opening mechanism is automatically actuated in response to closure of the light-shielding lid of the camera and no additional operation is required for actuating the door opening mechanism. In the camera, the door opening mechanism is interlocked with the light-shielding lid of the camera by way of a member urged by a spring in one direction and the user must move the member in the reverse direction overcoming the force of the spring when the light-shielding lid is closed. Accordingly, the camera is disadvantageous in that a large force is required when closing the light-shielding lid of the camera.

SUMMARY OF THE INVENTION

In view of the foregoing observations and description, the primary object of the present invention is to provide a photographic camera in which the door opening mechanism can be automatically actuated without necessity for an additional operation or a large operating force.

The photographic camera in accordance with the present invention is characterized by having a light-shielding door opening and closing mechanism which opens and closes the light-shielding door of the film magazine loaded in the magazine chamber, an electric motor which is disposed in the camera and provides the light-shielding door opening and closing mechanism with driving force for opening and closing the light-shielding door, and a control means which causes the light-shielding door opening and closing mechanism to open and close the light-shielding door under the driving force provided by the electric motor when the light-shielding lid is closed.

The electric motor may double as an electric motor for feeding the film.

It is preferred that the film magazine has a spool around which a roll film is wound and which is supported for rotation in the magazine body and is rotated to feed out or rewind the film through the film exit slit by the driving force provided by said electric motor, and the light-shielding door opening and closing mechanism be arranged to open the light-shielding door when the spool is rotated in the rewinding direction with the light-shielding door closed.

The light-shielding door opening and closing mechanism may comprise a light-shielding door driving member which is brought into engagement with the light-shielding door and is rotated to open and close the light-shielding door, and a driving force transmitting mechanism for opening and closing the light-shielding door which receives the driving force of the electric motor from a part of a film feed mechanism which is driven by said electric motor and transmits the driving force to the light-shielding door driving member only when the light-shielding door is to be closed or opened.

The driving force transmitting mechanism for opening and closing the light-shielding door may comprise a sun gear which forms a part of the film feed mechanism, a planetary gear in mesh with the sun gear, a revolution limiting mechanism which selectively prevents and permits revolution of the sun gear and an engagement member which is actuated by rotation of the sun gear to be engaged with the light-shielding door opening and closing mechanism.

The camera in accordance with the present invention may be provided with a light-shielding lid lock member which is adapted to be engaged with the light-shielding lid and holds it in the closed position and a lock release member which is driven by said electric motor to release the light-shielding lid from the light-shielding door lock member.

In such a case, it is preferred that said control means inhibits opening and closing of the light-shielding door by the driving force of the motor when the light-shielding lid lock member is not engaged with the light-shielding lid.

In the camera of the present invention, the light-shielding door of the film magazine is opened and closed by the light-shielding door opening and closing mechanism which is driven by the electric motor and accordingly, a large force is not required to close the light-shielding lid of the camera. At the same time, since the electric motor is automatically controlled by the control means, the user need not make an additional operation for actuating the light-shielding door opening and closing mechanism. Further since the control means causes the light-shielding door opening and closing mechanism to open and close the light-shielding door while the light-shielding lid is closed, the film cannot be exposed to light when the light-shielding door is opened. When the electric motor doubles as the motor for feeding the film, the camera can be manufactured at low cost and can be smaller in size.

When the light-shielding door opening and closing mechanism is arranged to open the light-shielding door when the spool is rotated in the rewinding direction with the light-shielding door closed, the film is prevented from being fed toward the film exit slit when the light-shielding door is closed and being damaged by impact against the light-shielding door.

When a light-shielding lid lock member which is adapted to be engaged with the light-shielding lid and holds it in the closed position and a lock release member which is driven by said electric motor to release the light-shielding lid from the light-shielding door lock member are provided, lock of the light-shielding lid can be released by a very small force. Further when the control means is arranged to inhibit opening and closing of the light-shielding door by the driving force of the motor when the light-shielding lid lock member is no engaged with the light-shielding lid, accidental exposure of the film can be prevented.

When the driving force transmitting mechanism for opening and closing the light-shielding door comprises a sun gear, a planetary gear, a revolution limiting mechanism and an engagement member, the motor can be rotated in the same direction irrespective of whether the light-shielding door is opened or closed as will be described later in conjunction with an embodiment of the present invention.

BRIEF DESCRIPTION OF THE DRAWINGS

FIG. 7 is a time chart for illustrating the operation of the camera, FIGS. 9A to 9D are views for illustrating the operation of the inner structure of the camera, FIG. 14 is an exploded perspective view showing an important part of the driving mechanism of the camera shown in FIG. 11, FIGS. 15 to 20 are views for illustrating the operation of the driving mechanism.

DESCRIPTION OF THE PREFERRED EMBODIMENT

Figure 1:
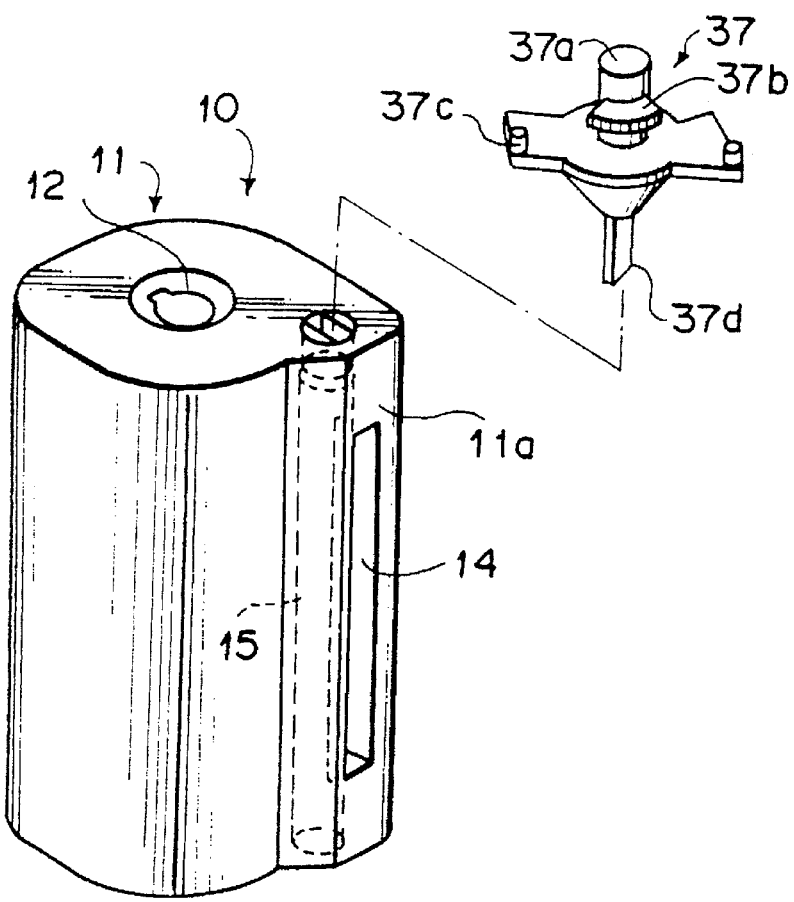
FIG. 1 is a perspective view showing a film magazine to be loaded in a camera in accordance with an embodiment of the present invention.
Figure 2A:
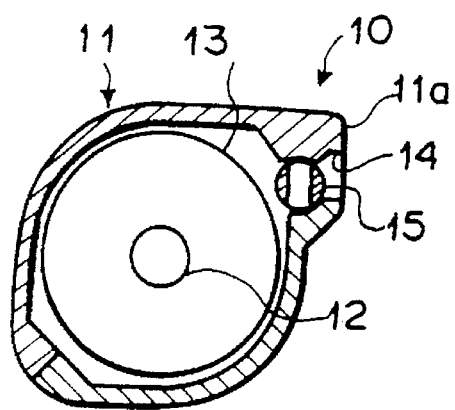
FIG. 2A is cross-sectional view of the film magazine shown in FIG. 1 with the light-shielding door closed.
Figure 2B:
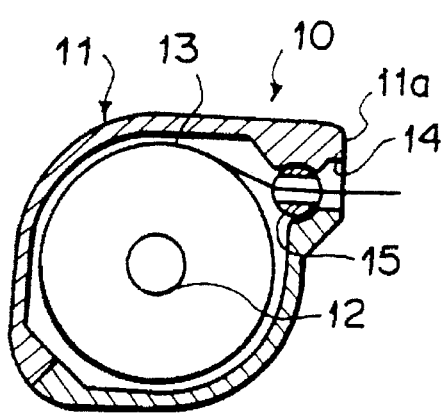
FIG. 2B is cross-sectional view of the film magazine shown in FIG. 1 with the light-shielding door opened.

FIGS. 1, 2A and 2B show a film magazine 10 which is loaded in a camera 20 (FIG. 3) in accordance with an embodiment of the present invention.

The film magazine 10 comprises a magazine body 11 and a spool 12 supported for rotation in the magazine body 11. A roll film 13 is wound around the spool 12. A film exit slit 14 is formed in a side surface 11a of the magazine body 11 to extend in the longitudinal direction of the magazine body 11. A light-shielding door 15 is supported in the magazine body 11 for rotation between a closing position where it closes the film exit slit 14 in a light-tight fashion and an opening position where it opens the film exit slit 14. Though not shown, the film magazine 10 is provided with a data disk which carries information on whether or not the film 13 in the magazine body 11 has been exposed. The information carried by the data disk is read by a reading system provided on the camera when the film magazine 10 is loaded in the camera and the spool 12 is rotated.

Figure 3:
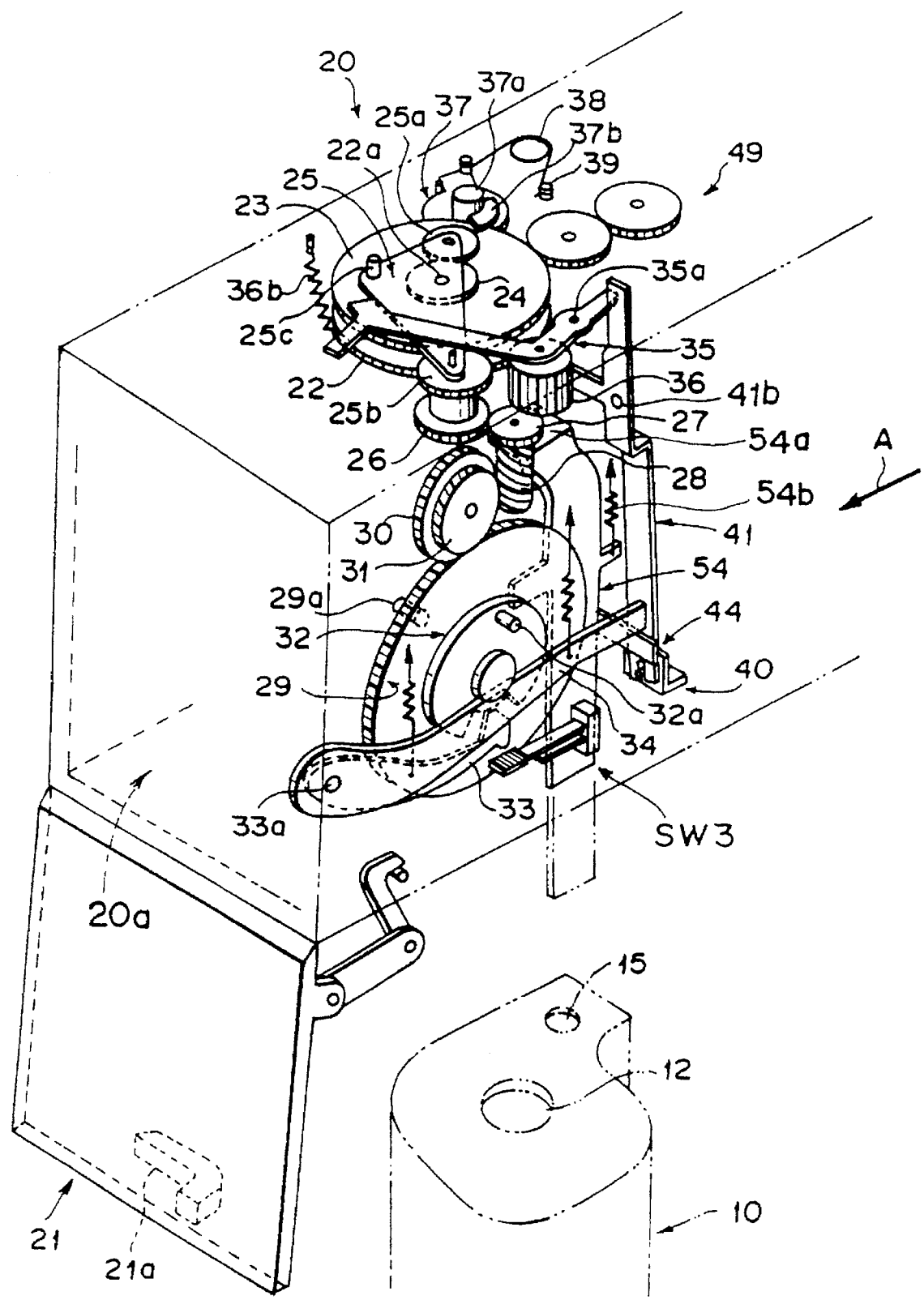
FIG. 3 is a fragmentary perspective view showing the inner structure of the camera.

As shown in FIG. 3, the camera 20 is provided with a magazine chamber 20a in which the film magazine 10 is accommodated and a bottom lid 21 for opening and closing the magazine chamber 20a is hinged to the camera body.

In an upper portion of the magazine chamber 20a, a spool gear 22 provided with a spool driver (not shown) which is brought into engagement with the spool 12 of the film magazine 10 when the film magazine 10 is loaded in the magazine chamber 20a is supported for rotation about a pin 23a. A gear 23 of the same size as the spool gear 22 is supported for rotation about the pin 23a above the spool gear 22. The spool gear 22 and the gear 23 can be rotated independently from each other.

A small diameter gear 24 formed integrally with the gear 23 is provided on the upper surface of the gear 23. A planetary arm 25 on which first and second planetary gears 25a and 25b are mounted is supported for rotation about the pin 23a. The first planetary gear 25a is in mesh with the small diameter gear 24 and the second planetary gear 25b is in mesh with the gear 23. That is, the gears 23 and 24 form a so-called sun gear. A gear 26 is disposed below the second planetary gear 25b to be rotated together with the second planetary gear 25b. The gear 26 is positioned below the spool gear 22 and is not in mesh with the spool gear 22.

A gear 27 is supported for rotation in the vicinity of the spool gear 22 and is brought into mesh with the gear 26 when the planetary arm 25 is in the position shown in FIG. 3. A worm 28 formed integrally with the gear 27 is provided on the lower surface of the gear 27. A cam gear 29 is supported for rotation below the worm 28 and a gear 30 which is in mesh with the cam gear 29 is provided above the gear 29. A helical gear 31 is formed on one surface of the gear 30 integrally therewith and in mesh with the worm 28.

A cam plate 32 is formed on the front surface of the cam gear 29 integrally therewith and a pin 29a projects rearward from the rear surface of the cam gear 29. A pin 32a projects forward from the front surface of the cam plate 32. A cam lever 33 and a lock release arm 34 are supported for rotation about a pin 33a in the vicinity of the cam gear 29.

Further a lifter 54 extends in the vertical direction in the vicinity of the cam gear 29 and supported to be movable up and down. The lifter 54 is provided with a hook portion 54a at the upper end thereof. As will be described later, the lifter 54 is moved upward (downward as seen in FIG. 3: the camera is held upside down when the film magazine 10 is loaded in or unloaded from the camera) by the pin 29a on the cam gear 29 when the light-shielding door 15 is opened and the hook portion 54a lifts the film magazine 10 to a position where the film magazine 10 can be taken out. The lifter 54 is urged upward (as seen in FIG. 3) by a spring 54b.

A clutch arm 35 is supported for rotation about a pin 35a in the vicinity of the spool gear 22 and a clutch gear 36 for connecting the gear 23 to the spool gear 22 and disconnecting the same from the spool gear 22 is mounted for rotation on the clutch arm 35. That is, the clutch arm 35 is rotated between a connecting position where the clutch gear 36 is in mesh with the gears 22 and 23 to connect them and a disconnecting position where the clutch gear 36 is away from the gears 22 and 23 to disconnect them. The clutch arm 35 is normally urged clockwise (toward the connecting position) by a spring 36b. When the clutch gear 36 is in mesh with the gears 22 and 23, the planetary arm 25 is held to prevent revolution of the planetary gears 25a and 25b.

A light-shielding door driving member 37 having a driver 37d (FIG. 1) is supported for rotation about a pin 37a on the side of the spool gear 22 opposite to the clutch gear 36. The driver 37d is brought into engagement with the light-shielding door 15 of the film magazine 10 when the film magazine 10 is loaded in the magazine chamber 20a. A sector gear 37b is formed integrally with the light-shielding door driving member 37 and is in mesh with the first planetary gear 25a. A toggle spring 38 is fixed to an end portion of the light-shielding door driving member 37 and to a fixed pin 39 at the other end thereof.

Figure 4:
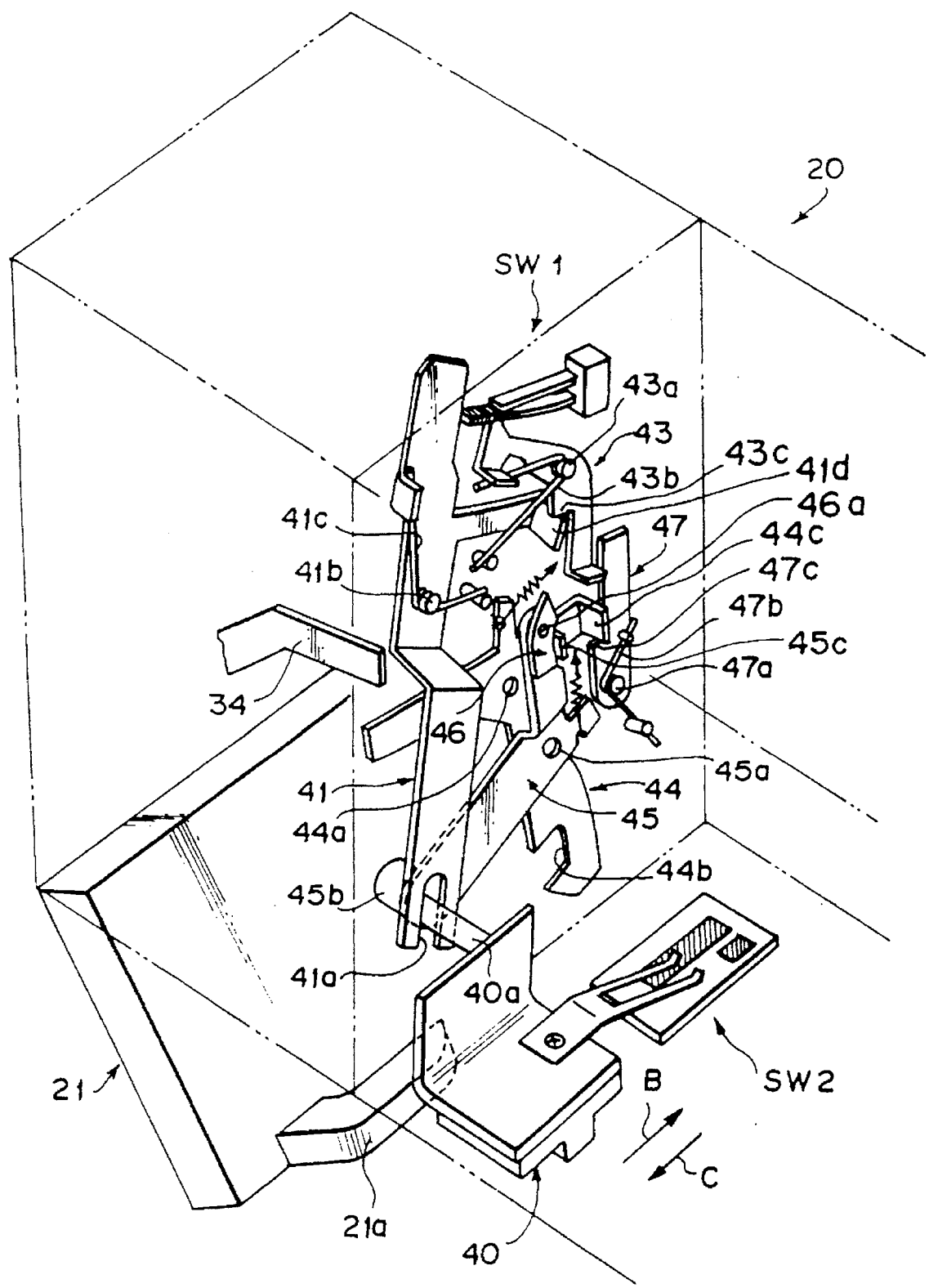
FIG. 4 is a perspective view showing the inner structure of the camera as seen in the direction of arrow A in FIG. 3.

As shown in FIG. 4, a bottom lid lock release knob 40 is provided on the bottom of the camera 20 to be slidable back and forth as shown by arrows B and C. The lock release knob 40 has a pin 40a which is in engagement with a cutaway portion 41a of a lever 41. The lever 41 is supported for rotation about a pin 41b and is counterclockwise urged by a torsion spring 41c.

Five levers 43, 44, 45, 46 and 47 are supported for rotation in the vicinity of the lever 41. The lever 41 has an arm 41d which extends rightward. The lever 43 has a shoulder 43c which is in engagement with the end of the arm 41d of the lever 41 and is supported for rotation about a pin 43a. Further the lever 43 is urged in the clockwise direction by a torsion spring 43b. The lever 44 is like a cross in shape and supported for rotation about a pin 44a. Further the lever 44 is urged in the clockwise direction. The lever 44 has an engagement portion 44b which is adapted to be engaged with an engagement portion 21a formed on the inner surface of the bottom lid 21. The arm 44c of the lever 44 which extends rightward is in engagement with a shoulder 47c of the lever 47 at the end thereof. The lever 45 is L-shaped and is supported for rotation about a pin 45a. The lever 45 is urged in the counterclockwise direction. The lever 45 is further provided with a pin 45b which slides on the engagement portion 21b of the bottom lid 21 when the bottom lid 21 is opened and closed. Further the lever 45 is provided with a hook portion 45c at the upper end thereof and the lever 46 is disposed to be engaged with the hook portion 45c. The lever 46 is supported on the lever 45 to be rotatable about a pin 46a and is urged in the counterclockwise direction. The lever 47 is in engagement with the lower end portion of the lever 43 and is supported for rotation about a pin 47a. The lever 47 is urged in the counterclockwise direction by a torsion spring 47b.

Figure 5:
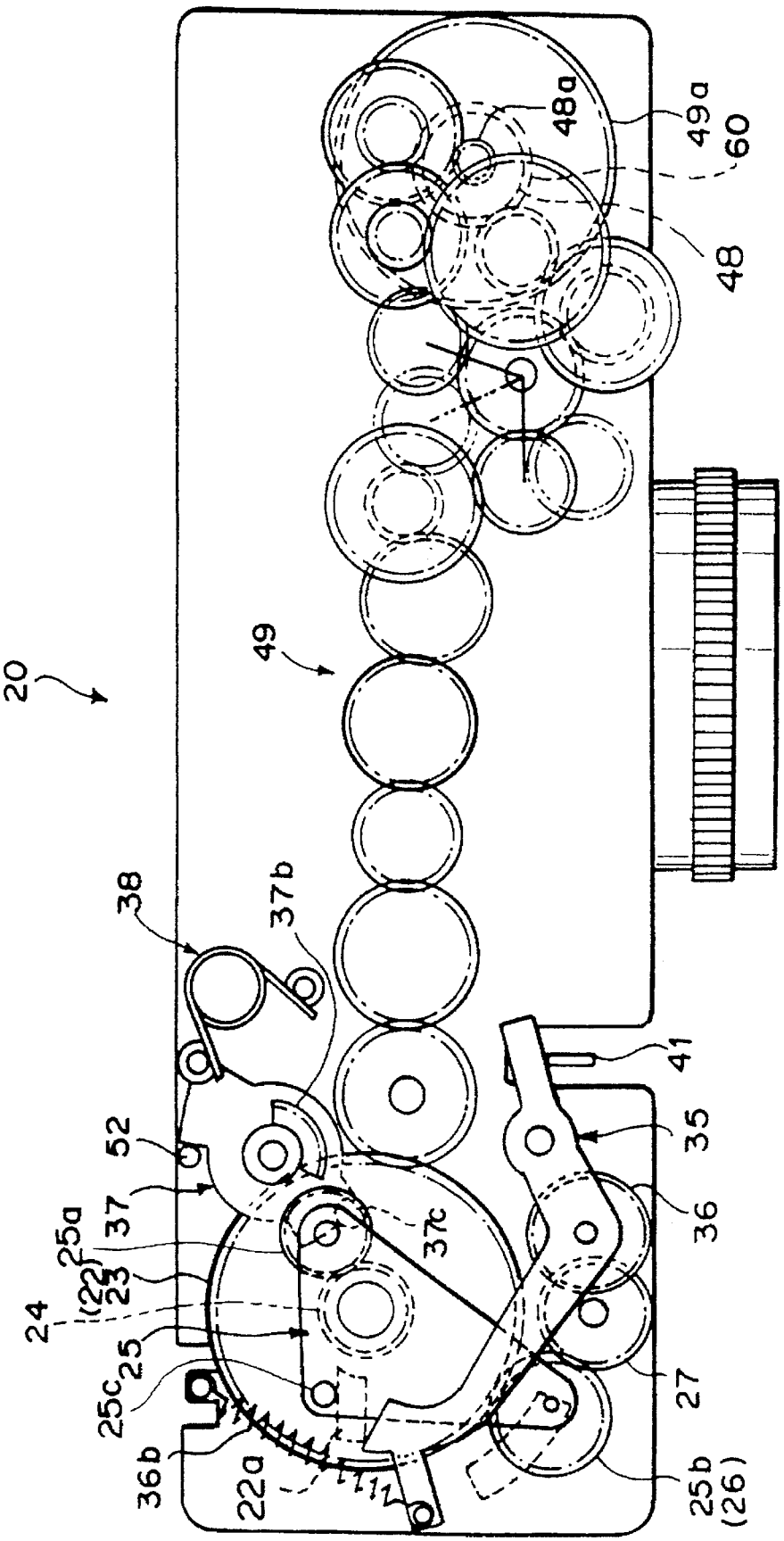
FIG. 5 is a schematic plan view showing the film feed mechanism of the camera.
Figure 6:
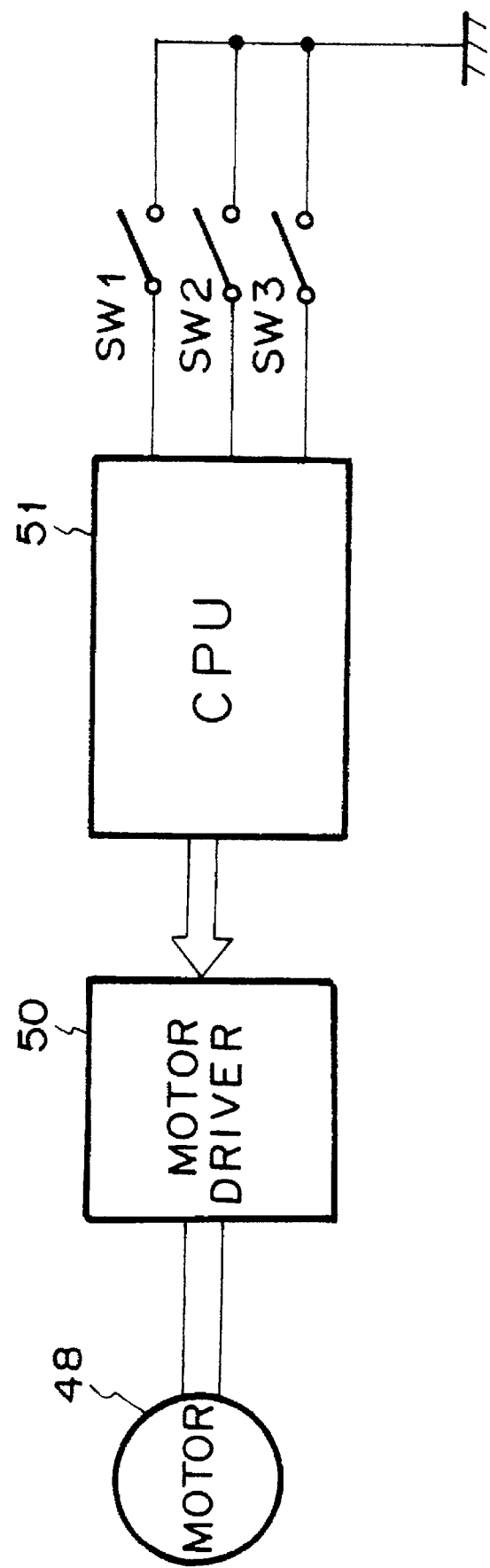
FIG. 6 is a schematic view showing the circuit for controlling the motor for feeding the film.

The elements described above are operated by the driving force of an electric motor 48 (FIG. 5) for feeding the film. As shown in FIG. 5, the motor 48 is disposed inside a take-up spool 60 which is below a takeup spool gear 49a. The driving force of the motor 48 is transmitted to the take-up spool gear 49a or a magazine spool gear 22 through a gear train 49. Said sun gear formed by the gears 23 and 24 forms a part of the gear train 49 and the driving force of the motor 48 is transmitted to the spool 12 of the magazine 10 through the sun gear.

The motor 48 is driven by a motor driver 50 which is controlled by a CPU 51. The motor 48 is rotated in the clockwise direction (film rewinding direction in this particular embodiment), is rotated in the counterclockwise direction (film feed-out direction in this particular embodiment) or is held stationary under the control of the driving current from the motor driver 50. The CPU 51 outputs a control signal according to on or off of first to third switches SW1, SW2 and SW3 provided in the camera 20.

As shown in FIG. 4, the first switch SW1 is turned on when the lever 43 is rotated in the clockwise direction (the state shown in FIG. 4) and turned off when the lever 43 is rotated in the counterclockwise direction. The second switch SW2 is turned on when the bottom lid lock release knob 40 is moved in the direction of arrow B in FIG. 4 and is turned off when the knob 40 is moved in the direction of arrow C (the state shown in FIG. 4). As shown in FIG. 3, the third lever SW3 is turned on when the cam lever 33 is rotated in the clockwise direction and turned off when the lever 33 is rotated in the counterclockwise direction (the state shown in FIG. 3).

The operation of the camera 20 will be described with reference to FIGS. 7, 8A to 8C and 9A to 9D, hereinbelow.

In the state where the bottom lid 21 is opened and the film magazine 10 is to be loaded as shown in FIG. 3, the first switch SW1 is on, the second switch SW2 is off, the third switch SW3 is off and the motor 48 stands still as shown in FIGS. 4, 5 and 9A.

When the film magazine 10 is loaded and the bottom lid 21 is closed, the engagement portion 21a of the bottom lid 21 pushes the pin 45b of the lever 45 to rotate the lever 45 in the clockwise direction. When the lever 45 is rotated in the clockwise direction, the lever 46 rotates the lever 43 in the counterclockwise direction, thereby rotating the lever 47 in the clockwise direction, whereby the lever 43 is moved away from the first switch SW1 to turn off the first switch SW1 and the shoulder 43c of the lever 43 is disengaged from the arm 41d of the lever 41 to permit the lever 41 to rotate in the counterclockwise direction under the force of the spring 41c. When the lever 41 is rotated in the counterclockwise direction, the bottom lid lock release knob 40 is moved rightward (as seen in FIGS. 9A to 9D or in the direction of arrow B in FIG. 4) and the second switch SW2 is turned on. Further when the lever 47 is rotated in the clockwise direction, the shoulder 47c of the lever 47 is disengaged from the arm 44c of the lever 44 and the lever 44 is rotated in the clockwise direction. Thus when the bottom lid 21 is closed, the engagement portion 21a of the bottom lid 21 is engaged with the engagement portion 44b of the lever 44 and the bottom lid 21 is locked as shown in FIG. 9C.

When the lever 41 is rotated in the counterclockwise direction, the clutch arm 35 is released and the clutch arm 35 is rotated in the clockwise direction from the position shown in FIG. 5 to bring the clutch gear 36 into engagement with the gear 23 and the spool gear 22. During the rotation of the clutch arm 35, the end of the clutch arm 35 pushes the pin 25c on the planetary arm 25 to rotate the planetary arm 25 in the clockwise direction, whereby revolution of the planetary gears 25a and 25b is prevented.

Further the CPU 51 detects that the first switch SW1 is off and the second switch SW2 is on and causes the motor 48 to rotate in the clockwise direction (film rewinding direction in this particular embodiment). The driving force of the motor 48 is transmitted to the gear 23 and rotates the gear 23 in the counterclockwise direction. Since the gear 23 is connected to the spool gear 22 through the clutch gear 36 at this time, the spool gear 22 is rotated in the counterclock- wise direction when the gear 23 rotates in the counterclockwise direction, whereby the film is wound around the spool 12 more tightly. The information carried by the data disk is read at this time.

As shown in FIG. 5, a projection 22a is formed on the lower surface of the spool gear 22. When the spool gear 22 is rotated by a predetermined angle, the projection 22a is brought into engagement with a projection 37c on the light-shielding door driving member 37 and when the spool gear 22 is further rotated, the light-shielding door driving member 37 is rotated by a predetermined angle in the clockwise direction. When the light-shielding door driving member 37 is rotated by the predetermined angle, the toggle spring 38 is turned over and the light-shielding door driving member 37 is held in the position shown in FIG. 8A under the force of the toggle spring 38. In the position shown in FIG. 8A, the light-shielding door driving member 37 is pressed against a stopper 52. The clockwise rotation of the light-shielding door driving member 37 opens the light-shielding door 15 to permit the film 13 to be fed out through the film exit slit 14.

As shown in FIG. 7, after a predetermined number of rotations in the clockwise direction, the motor 48 is caused to rotate in the counterclockwise direction (the film feed-out direction) by the CPU 51 to feed out the film 13 one frame by one frame. After all the frames are exposed, the motor 48 is rotated in the clockwise direction under the control of the CPU 51 until the whole film 13 is rewound into the magazine body 11.

When the film magazine 10 is to be taken out, the lock release knob 40 is slid leftward from the position shown in FIG. 9B. When the lock release knob 40 is slid leftward, the second switch SW2 is turned off and the lever 41 rotates in the clockwise direction. When the lever 41 is rotated by a predetermined angle, the arm 41d of the lever 41 is brought into engagement with the shoulder 43c of the lever 43 and the lever 43 is rotated in the clockwise direction under the urging force to turn on the first switch SW1 as shown in FIG. 9C. During the clockwise rotation, the lever 41 pushes the clutch arm 35 to rotate the clutch arm 35 in the counterclockwise direction as shown in FIG. 8B, whereby the gear 23 is disconnected from the spool gear 22.

The CPU 51 detects that the second switch SW2 is off and the first switch SW1 is on and causes the motor 48 in the clockwise direction. Though the gear 23 is rotated in the counterclockwise direction by the motor 48, neither the spool gear 22 nor the spool 12 is rotated since the spool gear 22 has been disconnected from the gear 23. Since the planetary arm 25 has been released from the clutch arm 35, the counterclockwise rotation of the gear 23 causes the planetary arm 25 to move in the counterclockwise direction in response rotation of the sun gear 24 formed integrally with the gear 23, thereby bringing the gear 26 into mesh with the gear 27 as shown in FIG. 8C. In order to properly position the gear 26 relative to the gear 27, the rotation of the planetary arm 25 is limited within a predetermined angle by a stopper groove 53.

Figure 8A:
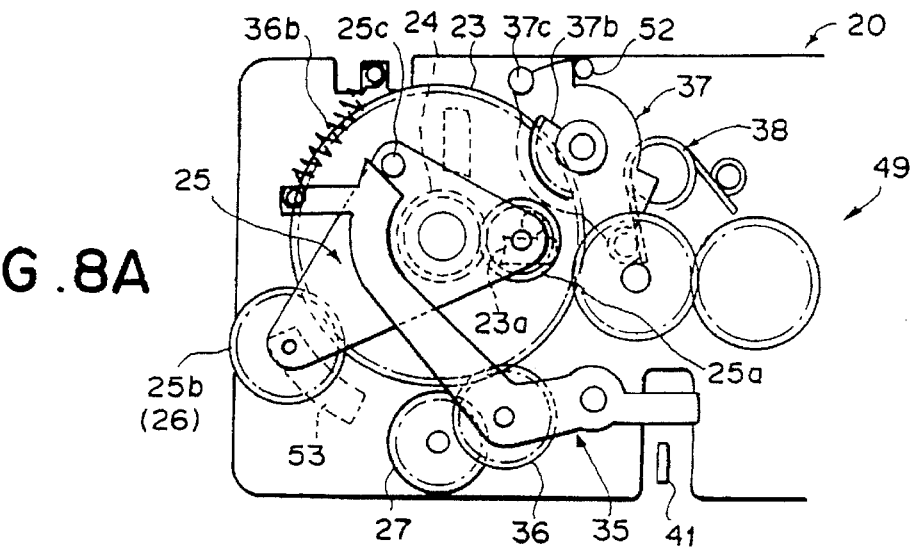
FIGS. 8A to 8C are views for illustrating the operation of the inner structure of the camera.
Figure 8B:
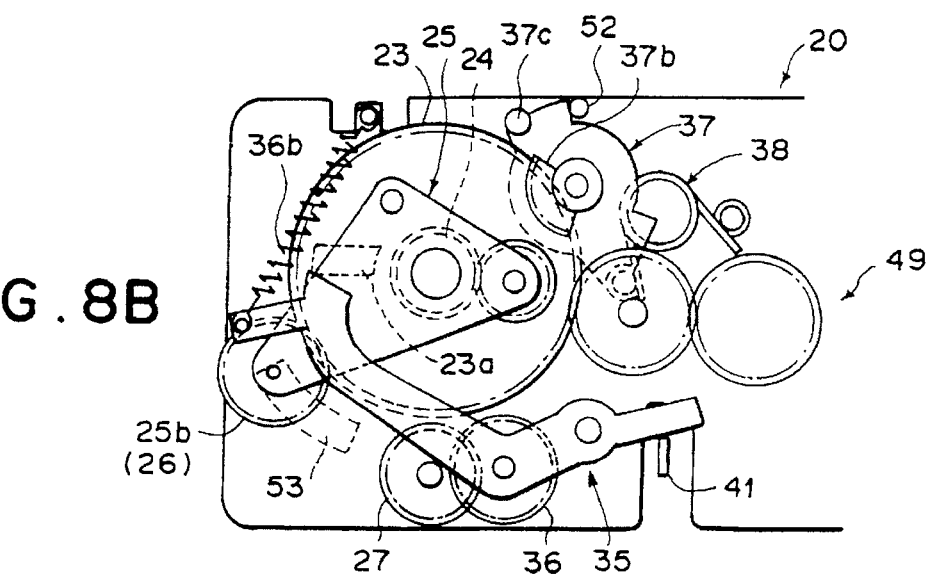
Figure 8C:
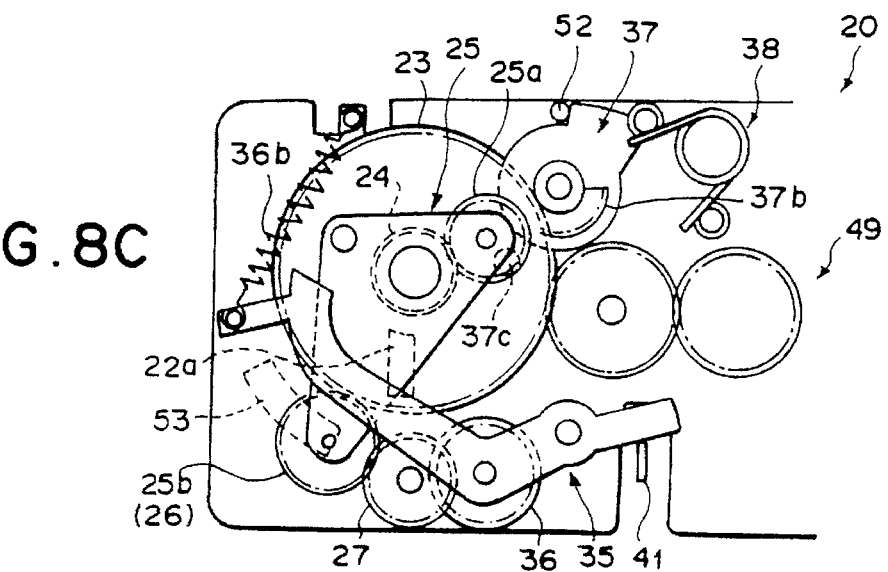

During the rotation of the planetary arm 25, the planetary gear 25a is brought into mesh with the sector gear 37b on the light-shielding door driving member 37 and rotates the light-shielding door driving member 37 in the counterclockwise direction by a predetermined angle from the position shown in FIG. 8B while rotating in the clockwise direction. When the light-shielding door driving member 37 rotates by the predetermined angle, the toggle spring 38 is turned over and holds the light-shielding door driving member 37 in the position shown in FIG. 8C. Further the rotation of the light-shielding door driving member 37 closes the light-shielding door 15, whereby the film exit slit 14 is light-tightly closed.

When the gear 23 is further rotated in the counterclockwise direction with the gear 26 in mesh with the gear 27, the rotational force of the gear 23 is transmitted to the cam gear 29 through the gears 26 and 27, the worm 28, the helical gear 31 and the gear 30, whereby the cam gear 29 is rotated in the clockwise direction from the position shown in FIG. 3. When the cam gear 29 is rotated by a predetermined angle, the cam plate 32 rotates the cam lever 33 in the clockwise direction to turn on the third switch SW3.

When the cam gear 29 is further rotated, the pin 32a on the cam plate 32 is brought into contact with the arm 34 to rotate the arm 34 in the clockwise direction. The arm 34 abuts against the lever 44 to rotate the lever 44 in the counterclockwise direction as shown in FIG. 9D. The rotation of the lever 44 causes the engagement portion 21a of the bottom lid 21 to be disengaged from the engagement portion 44b of the lever 44, whereby lock of the bottom lid 21 is released to permit the bottom lid 21 to be opened. The lever 44 is held in the rotated position by engagement between the arm 44c and the shoulder 47c of the lever 47 while the arm 34 is returned to the original position by the urging force when the cam gear 29 is further rotated by a predetermined angle.

Figure 10A:
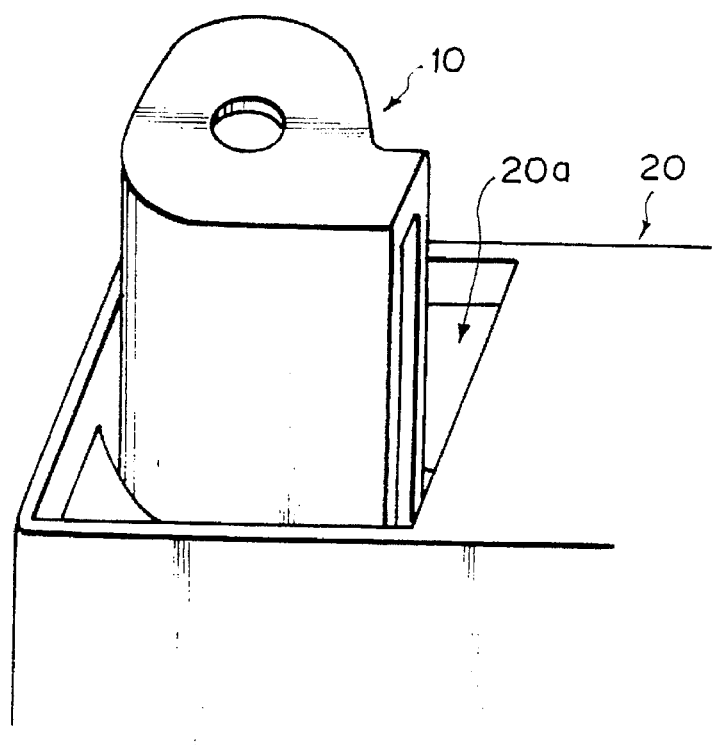
FIGS. 10A and 10B are schematic perspective views showing the mechanism for preventing the film magazine from falling in the magazine chamber after it is once lifted.
Figure 10B:
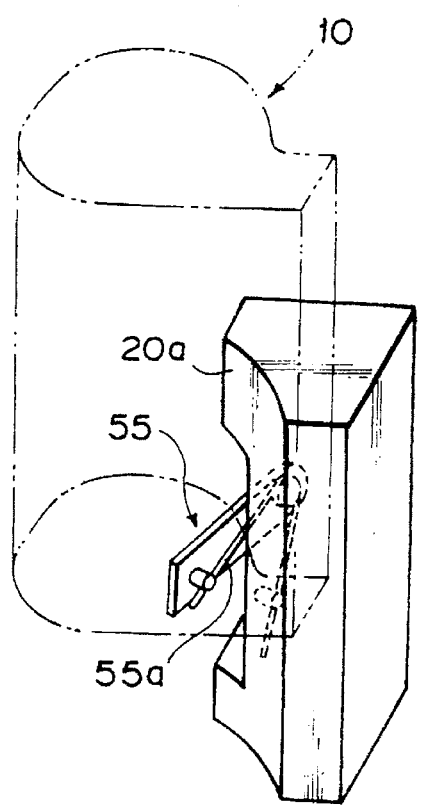

The rotation of the cam gear 29 further actuates the aforesaid lifter 54. Though the lifter 54 is normally urged toward the top of the camera as described above, the lifter 54 is moved toward the bottom of the camera pushed by the pin 29a of the cam gear 29 when the cam gear 29 is rotated, and the hook portion 54a lifts the film magazine 10 to a position where the film magazine 10 can be taken out (the camera is held upside down when the film magazine 10 is loaded in or unloaded from the camera). When the cam gear 29 is further rotated, the lifter 54 is released from the pin 29a and is returned to the original position under the force of the spring 54b. In this particular embodiment, a magazine holding member 55 prevents the film magazine 10 from falling into the magazine chamber 20a after the lifter 54 is returned to the original position as shown in FIG. 10A. As shown in FIG. 10B, the magazine holding member 55 is provided on the inner wall 20b of the magazine chamber 20a to be rotatable between a projecting position where it projects into the magazine chamber 20a from the inner wall 20b and prevents the film magazine 10 from falling into the chamber 20a under gravity and a retracted position where it permits the film magazine 10 to be inserted into the magazine chamber 20a. The magazine holding member 55 is normally urged toward the projecting position by a torsion spring 55a. When the film magazine 10 is inserted into the magazine chamber 20a, the film holding member 55 is forced to the retracted position overcoming the force of the spring 55a by the film magazine 10 and accordingly does not obstruct loading of the film magazine 10.

After the lift member 54 is returned into the magazine chamber 20a, the cam gear 29 continues to be rotated until it makes one rotation and returns to the position shown in FIG. 3. That is, when the cam gear 29 makes one rotation, the cam lever 33 falls into a recess 32b of the cam plate 32, whereby the cam lever 33 is moved away from the third switch SW3 and the third switch SW3 turns off. As soon as the third switch SW3 turns off, the CPU 51 stops the motor 48 and accordingly the cam gear 29 is stopped.

In the embodiment described above, opening and closing the light-shielding door 15 of the film magazine 10 and lock release of the bottom lid 21 are both effected by the driving force of the motor 48 and accordingly the bottom lid 21 can be opened and closed by a relatively small force though the bottom lid 21 is interlocked with the light-shielding door 15.

In U.S. Pat. No. 5,200,777, there is disclosed a film magazine provided with a spool lock mechanism for preventing rotation of the when the light-shielding door is closed. When such a film magazine having a spool lock mechanism is used, the spool lock mechanism can be damaged if the spool is rotated with the light-shielding door closed. In the embodiment described above, opening and closing the light-shielding door and rotation of the spool are effected by the driving force of the motor for feeding the film and accordingly, when the film magazine provided with the spool lock mechanism is to be used for the camera of the embodiment, the driving force of the motor should not be transmitted to the spool until the light-shielding door is opened.

Now another embodiment of the present invention in which opening and closing the light-shielding door and rotation of the spool are effected by the driving force of the motor for feeding the film and which is adapted to the film magazine provided with the spool lock mechanism will be described, hereinbelow.

Figure 11:
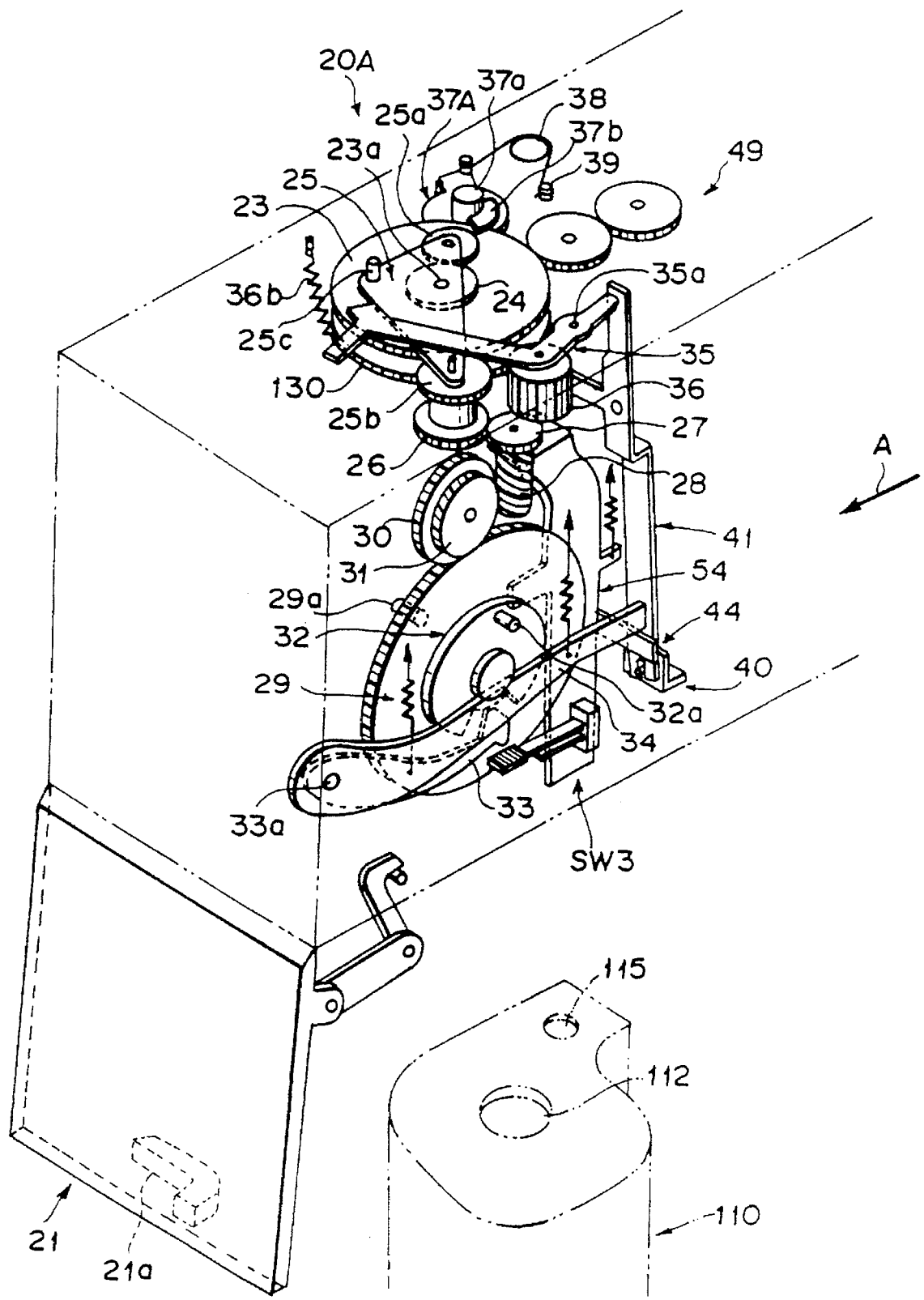
FIG. 11 is a view similar to FIG. 3 but showing the camera in accordance with another embodiment of the present invention.

As shown in FIG. 11, the camera 20A of this embodiment is basically the same in structure as the camera 20 of the preceding embodiment and accordingly the parts analogous to those in the preceding embodiment are given the same reference numerals and will not be described in detail here.

Figure 12:
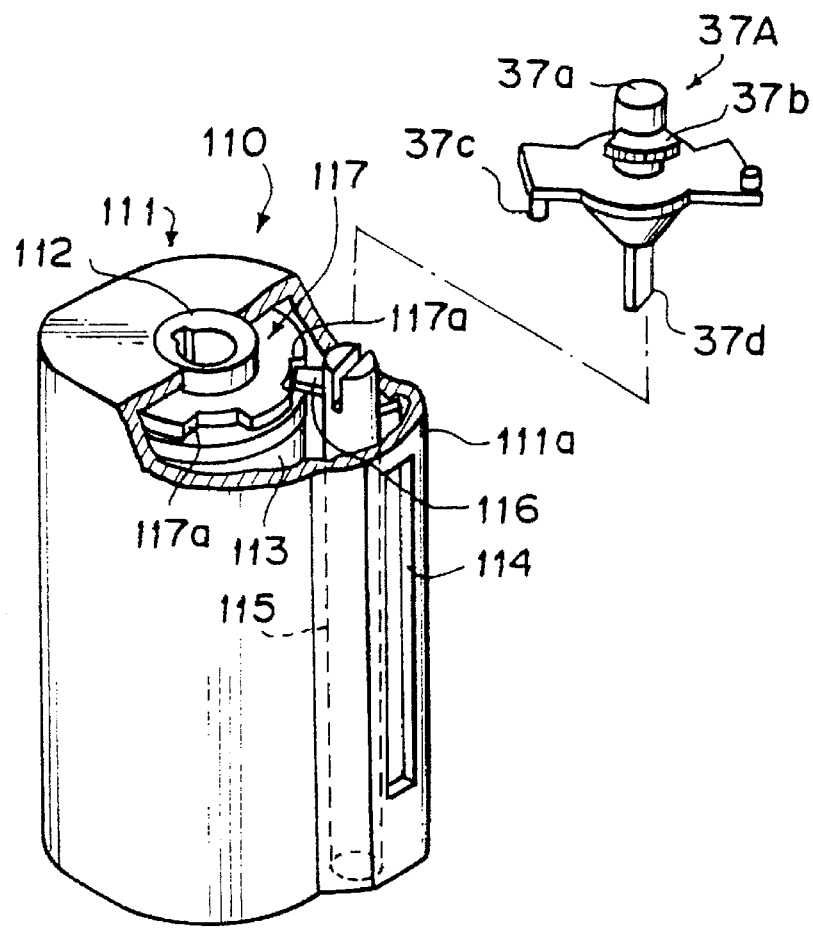
FIG. 12 is a perspective view partly cutaway showing a film magazine to be loaded in the camera.
Figure 13A:
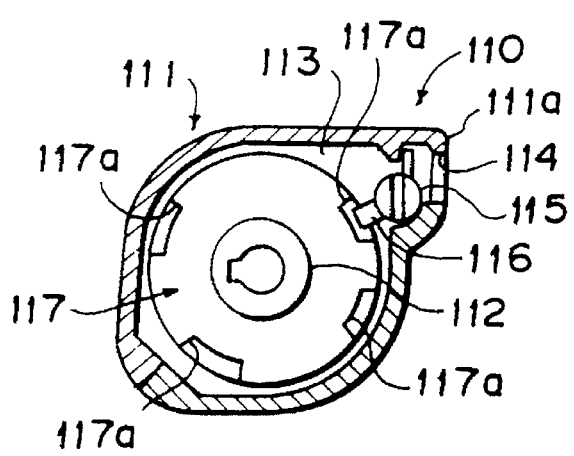
FIG. 13A is cross-sectional view of the film magazine shown in FIG. 12 with the light-shielding door closed.
Figure 13B:
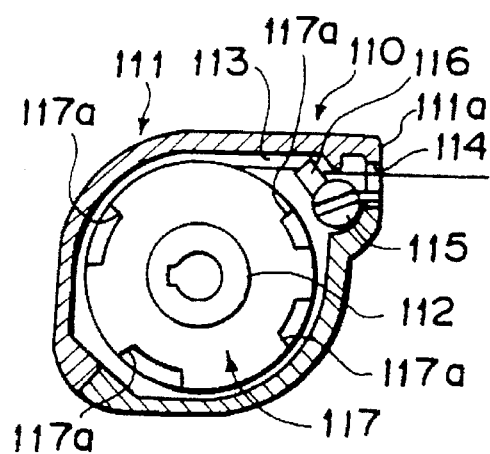
FIG. 13B is cross-sectional view of the film magazine shown in FIG. 12 with the light-shielding door opened.

FIGS. 12, 13A and 13B show a film magazine 110 which is loaded in the camera 20A.

The film magazine 110 comprises a magazine body 111 and a spool 112 supported for rotation in the magazine body 111. A roll film 113 is wound around the spool 112. A film exit slit 114 is formed in a side surface 111a of the magazine body 111 to extend in the longitudinal direction of the magazine body 111 A light-shielding door 115 is supported in the magazine body 111 for rotation between a closing position where it closes the film exit slit 114 in a light-tight fashion and an opening position where it opens the film exit slit 114.

The film magazine 110 is provided with a spool lock mechanism comprising a locking piece 116 formed on one end of the light-shielding door 115 and a locking disk 117 formed on the corresponding end of the spool 112. The lock disk 117 is provided with a plurality of notches 117a arranged in the circumferential direction of the disk 117. Rotation of the spool 112 is prevented by engagement of the locking piece 116 with one of the notches 117a. The locking piece 116 is brought into engagement with one of the notches 117a when the light-shielding door 115 is closed as shown in FIG. 13A and is disengaged from the same when the light-shielding door 115 is opened as shown in FIG. 13B. Thus the spool 112 cannot be rotated unless the light-shielding door 115 is opened.

The camera 20A of this embodiment differs from the camera 20 of the preceding embodiment in that the driving force of the motor 48 is transmitted to the light-shielding door 115 prior to the spool 112.

As shown in FIG. 14, the driving mechanism of the camera 20A comprises a spool rotating member 120 which is provided with a spool driver 121 adapted to be engaged with the spool 112 of the film magazine 110 and is supported for rotation about the rotational axis 23a of the gear 23, a delay gear 130 which is supported for rotation about the rotational axis 23a between the gear 23 and the spool rotating member 120, and a light-shielding door driving member 37A provided with a driver 37d adapted to be engaged with the light-shielding door 115.

The delay gear 130 is provided in place of the spool gear 22 in the preceding embodiment and is rotated together with the gear 23 only when it is connected to the gear 23 by the clutch gear 36 as shown in FIG. 11. Four engagement protrusions 131 are formed on the upper surface of the delay gear 130 at intervals 90° in the circumferential direction of the gear 130 and an arcuate opening 132 is formed in the delay gear 130 to extend substantially by 180° in the circumferential direction of the gear 130. The light-shielding door driving member 37A is provided with a projection 37c on its lower surface and the projection 37c is brought into engagement with one of the engagement protrusions 131 on the delay gear 130 when the light-shielding door driving member 37A is in the closing position where the light-shielding door 115 is closed. The spool rotating member 120 is provided with a pin 122 on its upper surface and the pin 122 is inserted into the arcuate opening 132 in the delay gear 130.

When the delay gear 130 is rotated in the clockwise direction (the film feed-out direction), the end 132a of the opening 132 (the rear end as seen in the clockwise direction) is brought into engagement with the pin 122 of the spool rotating member 120 to rotate the spool rotating member 120 in the clockwise direction, and when the delay gear 130 is rotated in the counterclockwise direction (the film rewinding direction), the end 132b of the opening 132 (the rear end as seen in the counterclockwise direction) is brought into engagement with the pin 122 of the spool rotating member 120 to rotate the spool rotating member 120 in the counterclockwise direction. In other words, when the delay gear 130 is rotated in the clockwise direction, the spool rotating member 120 is not rotated until the end 132a of the opening 132 is brought into engagement with the pin 122, and similarly when the delay gear 130 is rotated in the counterclockwise direction, the spool rotating member 120 is not rotated until the end 132b of the opening 132 is brought into engagement with the pin 122. Thus when the delay gear 130 is once rotated in one direction and then reversed, the spool rotating member 120 is not rotated until the delay gear 130 makes a half rotation.

On the other hand, since the engagement protrusions 131 are arranged at intervals of 90° , the projection 37c of the light-shielding door driving member 37A is brought into engagement with one of the engagement protrusions 131 while the delay gear 130 makes a quarter rotation and the light-shielding door driving member 37A is rotated so long as the spool rotating member 120 is in the closing position.

The operation of the driving mechanism in the camera 20A of this embodiment will be described with reference FIGS. 15 to 22, hereinbelow.

Figure 15:
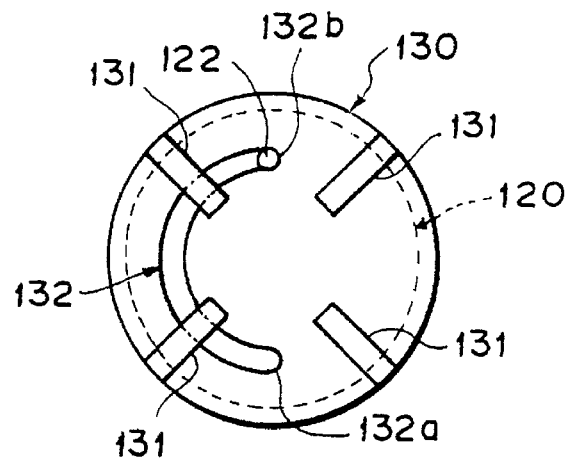
Figure 16:
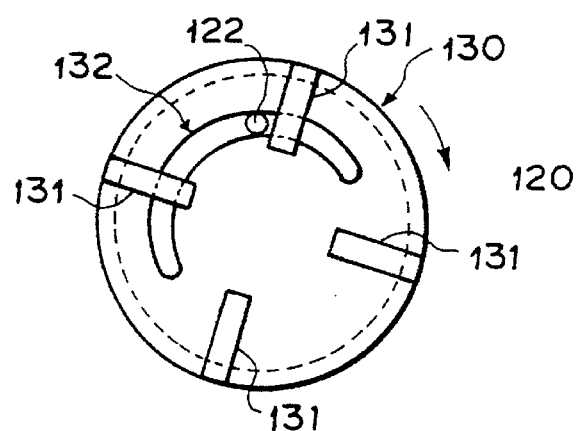

When rewinding of the film 113 of the film magazine 110 is completed, the delay 130 which has been rotated in the counterclockwise direction is stopped in the position shown in FIG. 15 and the spool rotating member 120 which has been rotated in the counterclockwise direction together with the delay gear 130 by way of the engagement between the pin 122 and the end 132b of the opening 132 is stopped in the position shown in FIG. 15. After once stopped, the delay gear 130 is then rotated in the clockwise direction substantially by 180°. and is stopped in the position shown in FIG. 17 where the pin 122 is about to be engaged with the end 132a of the opening 132. The spool rotating member 120 is not rotated at this time. The CPU 51A shown in FIG. 22 controls the position of the delay gear 130. That is, the CPU 51A controls the position of the delay gear 130 by controlling the motor 48 by way of the motor driver 50 on the basis of a signal from an encoder 140 which detects the number of rotations of the motor 48. The light-shielding door driving member 37A is held in the opening position and accordingly the projection 37c is brought into engagement with none of the engagement protrusions 131 on the delay gear 130 while the film 113 is rewound and the delay gear 130 is subsequently rotated in the clockwise direction substantially by 180°.

Figure 17:
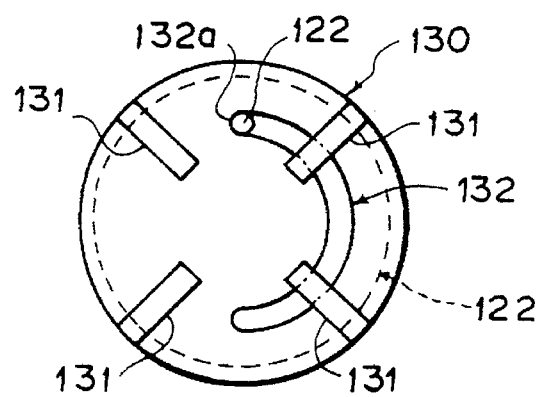

After the delay gear 130 is stopped in the position shown in FIG. 17, the film magazine 110 is taken out in the manner described above in conjunction with the preceding embodiment and the light-shielding door driving member 37A is moved to the closing position.

Figure 18:
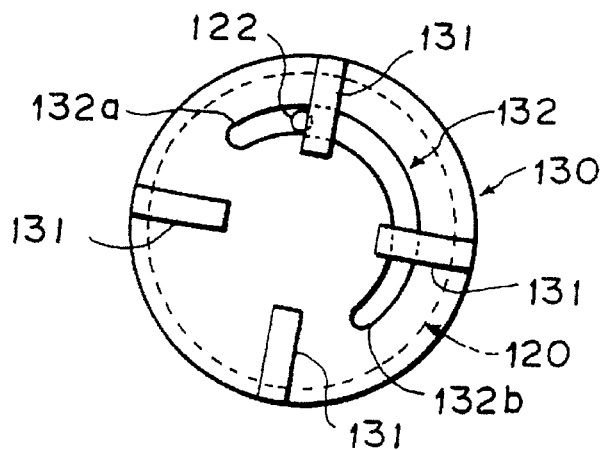

When the film magazine 110 is loaded in the magazine chamber 20a and the bottom lid 21 is closed, the motor 48 is caused to rotate in the clockwise direction to rotate the delay gear 130 in the counterclockwise direction as shown in FIG. 18. Before the delay gear 130 makes a quarter rotation, one of the engagement protrusions 131 is brought into engagement with the projection 37c of the light-shielding door driving member 37A to move the same to the opening position, whereby the light-shielding door 115 of the film magazine 110 is opened and the spool lock is released.

Figure 19:
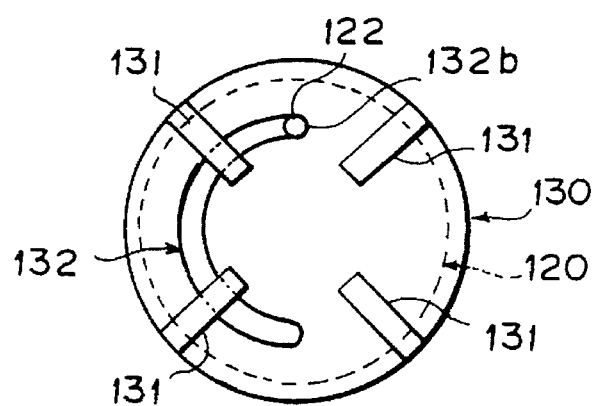
Figure 20:
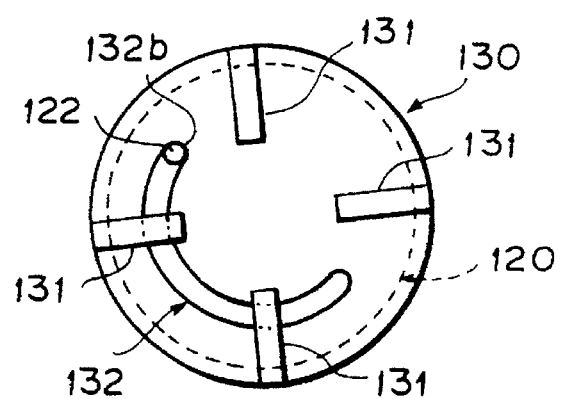
Figure 21:
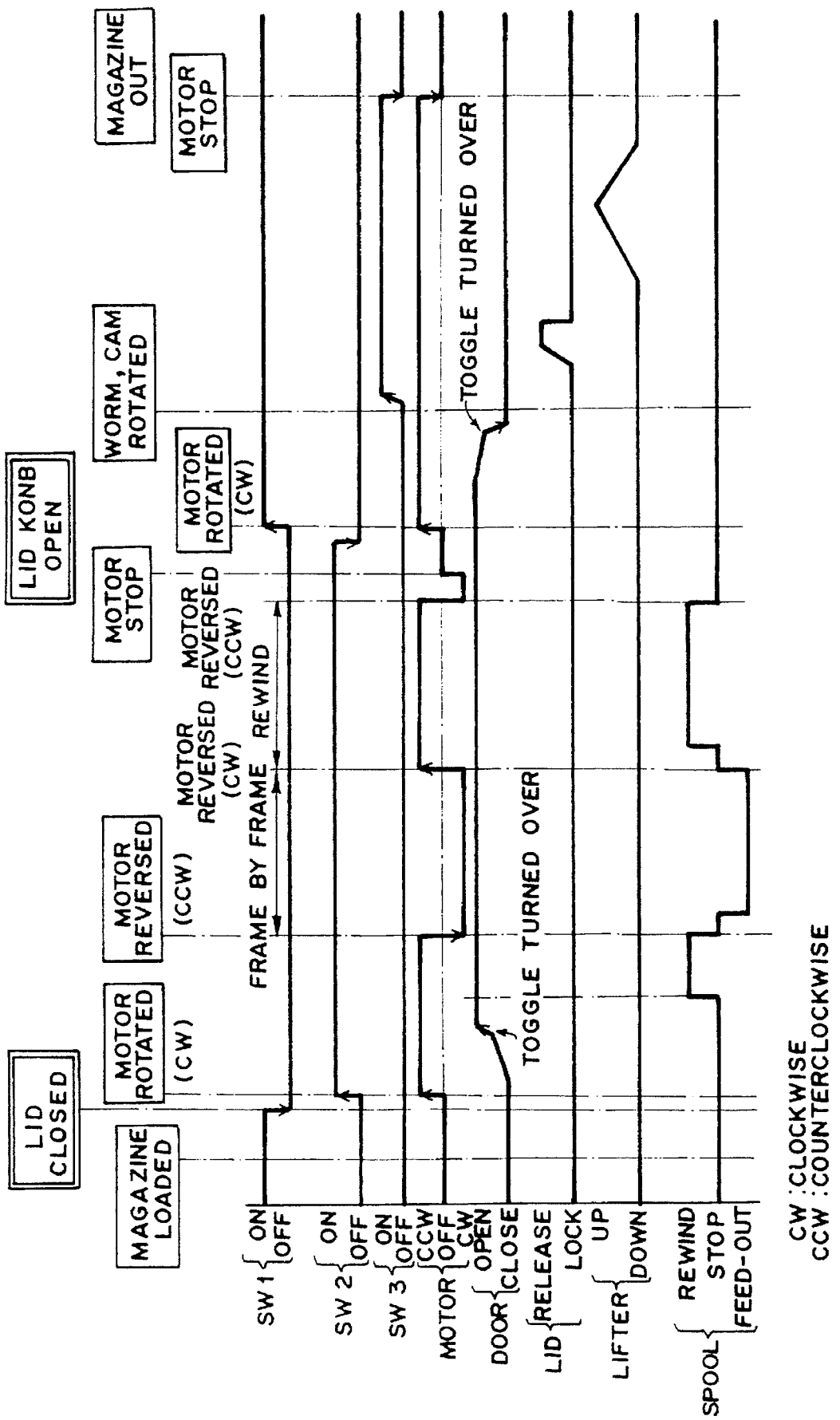
FIG. 21 is a time chart for illustrating the operation of the camera.
Figure 22:
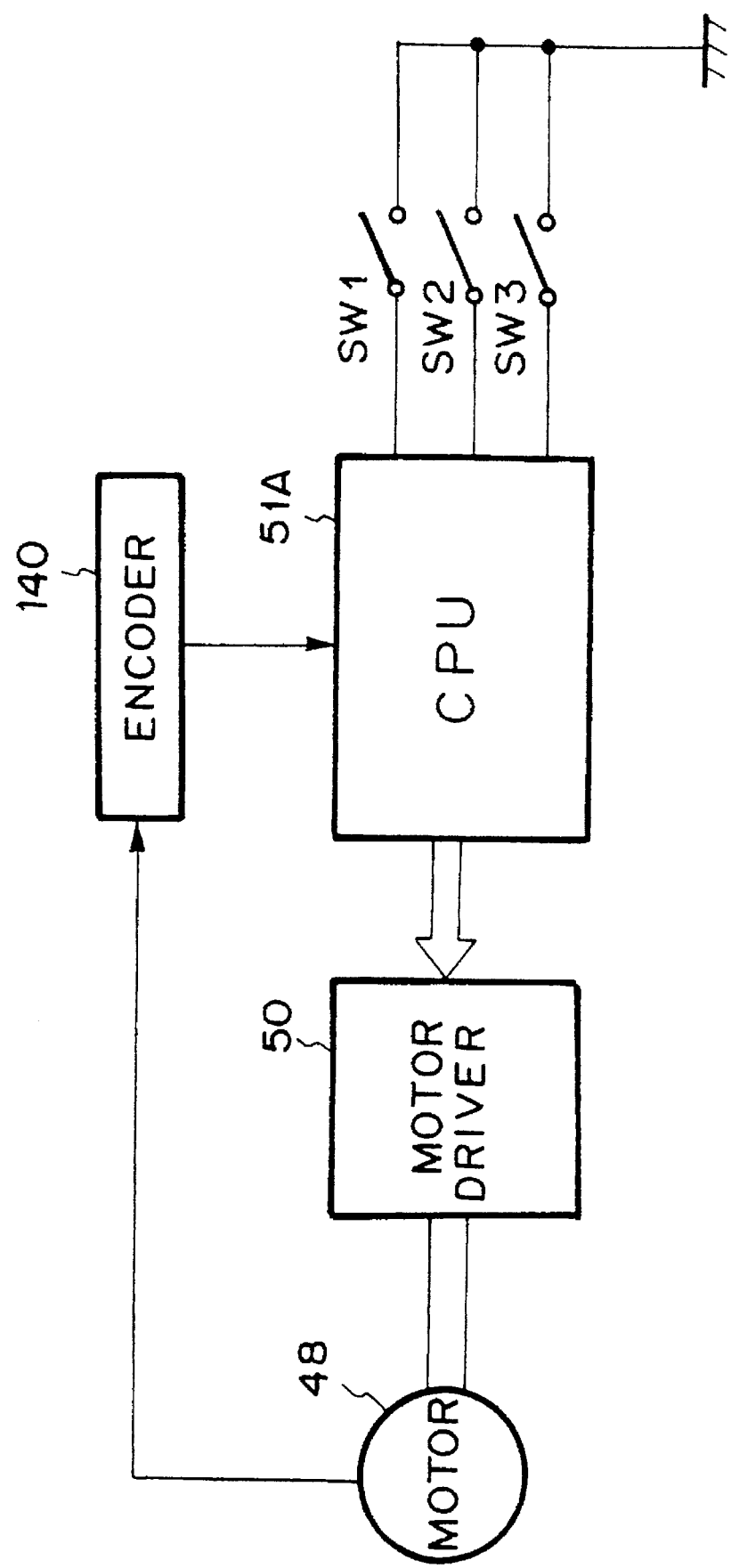
FIG. 22 is a schematic view showing the circuit for controlling the motor for feeding the film.

On the other hand, the spool rotating member 120 is not rotated until the delay gear 130 makes a half rotation and the end 132b of the opening 132 is brought into engagement with the pin 122 as shown in FIG. 19, and when the delay gear 130 is further rotated beyond the position shown in FIG. 19, the spool rotating member 120 begins to be rotated in the counterclockwise direction. Accordingly, the spool 112 of the film magazine 110 is not rotated until the light-shielding door 115 is opened and the spool lock is released.

In this particular embodiment, a key 121a is provided on the spool driver 121 to be slidable in the axial direction thereof and a key seat 112a adapted to be engaged with the key 121a is formed in the spool 112 so that the spool driving force is transmitted to the spool 112 only when the key 121a is engaged with the key seat 112a as shown in FIG. 14. Accordingly, depending on the position of the spool 112 relative to the spool driver 121 as the film magazine 110 is loaded, the spool 112 is not always engaged with the spool driver 121 and accordingly sometimes the spool 112 is not rotated for a while after the spool rotating member 120 begins to rotate. However this fact does not eliminate necessity of the driving mechanism described above since the spool 112 can be engaged with the spool driver 121 as soon as the film magazine 110 is loaded.

In the camera 20A of this embodiment, the driving force of the motor 48 is first transmitted to the light-shielding door driving member 37A to open the light-shielding door 115 and then transmitted to the spool 112 to rotate it. Accordingly, even if the film magazine 110 with the spool lock mechanism is used, the spool lock cannot be damaged.

Though, in the embodiment described above, the driving force of the motor 48 is used both for closing the light-shielding door 115 and opening the same, the mechanism may be arranged so that the driving force of the motor 48 is used only for opening the light-shielding door 115 and the light-shielding door 115 is manually closed. Further though, in the embodiment described above, the motor 48 is automatically controlled by the CPU 51A, the motor may be energized and de-energized through a switch operated by the user.

What is claimed is:

1. A photographic camera having a magazine chamber which is opened and closed by a light-shielding lid and in which is loaded a film magazine comprising a magazine body provided with a film exit slit and a light-shielding door for opening and closing the film exit slit, said camera comprising:

a light-shielding door opening and closing mechanism which opens and closes the light-shielding door of the film magazine loaded in the magazine chamber;

an electric motor which is disposed in the camera and provides the light-shielding door opening and closing mechanism with a driving force for opening and closing the light-shielding door, the driving force of said electric motor is also used for feeding the film; and a control means which causes the light-shielding door opening and closing mechanism to open and close the light-shielding door under the driving force provided by the electric motor when the light-shielding lid is closed;

wherein said light-shielding door opening and closing mechanism comprises a light-shielding door driving member which is brought into engagement with the light-shielding door and is rotated to open and close the light-shielding door, and a driving force transmitting mechanism which receives the driving force of the electric motor from a part of a film feed mechanism which is driven by said electric motor and transmits the driving force to the light-shielding door driving member only when the light-shielding door is to be closed or opened, said driving force transmitting mechanism for opening and closing the light-shielding door comprises a sun gear which forms a part of the film feed mechanism, a planetary gear in mesh with the sun gear, a revolution limiting mechanism which selectively prevents and permits revolution of the sun gear and an engagement member which is actuated by rotation of the sun gear to be engaged with the light-shielding door opening and closing mechanism.

2. A photographic camera as defined in claim 1 in which said film magazine has a spool around which a roll film is wound and which is supported for rotation in the magazine body and is rotated to feed out or rewind the film through the film exit slit by the driving force provided by said electric motor, and said light-shielding door opening and closing mechanism is arranged to open the light-shielding door when the spool is rotated in the rewinding direction with the light-shielding door closed.

3. A photographic camera as defined in claim 1 further comprising a light-shielding lid lock member which is adapted to be engaged with the light-shielding lid and holds it in the closed position and a lock release member which is driven by said electric motor to release the light-shielding lid from the light-shielding door lock member.

4. A photographic camera as defined in claim 3 in which said control means inhibits opening and closing of the light-shielding door by the driving force of the motor when the light-shielding lid lock member is not engaged with the light-shielding lid.

5. A photographic camera having a magazine chamber which is opened and closed by a light-shielding lid and in which is loaded a film magazine comprising a magazine body provided with a film exit slit, a light-shielding door for opening and closing the film exit slit and a spool around which a roll film is wound and which is supported for rotation in the magazine body and is rotated to feed out or rewind the film through the film exit slit, which camera characterized by having an electric motor, a spool rotating member which is engaged with the spool of the film magazine loaded in the magazine chamber and is driven by the electric motor to rotate the spool, a light-shielding door opening member which is engaged with the light-shielding door of the film magazine loaded in the magazine chamber and is driven by the electric motor to open the light-shielding door, and a driving mechanism which transmits the driving force of the electric motor to the light-shielding door opening member before the spool rotating member so that the spool is rotated after the light-shielding door is opened.

6. A photographic camera as defined in claim 5 further comprising a driving force transmitting member which is rotated by the driving force of the electric motor and is provided with first and second engagement means, the first engagement means being brought into engagement with the light-shielding door opening member to drive the same when the driving force transmitting member is rotated and the second engagement means being brought into engagement with the spool rotating member to drive the same when the driving force transmitting member is rotated, and a control means which controls rotation of the driving force transmitting member so that the first engagement means is brought into engagement with the light-shielding door opening member before the second engagement means is brought into engagement with the spool rotating member.

7. A photographic camera having a magazine chamber which is opened and closed by a light-shielding lid and in which is loaded a film magazine comprising a magazine body provided with a film exit slit and a light-shielding door for opening and closing the film exit slit, said camera comprising:

a motor;

a light-shielding door opening and closing mechanism which opens and closes the light-shielding door of the film magazine loaded in the magazine chamber, said opening and closing mechanism comprising a light-shielding door driving member which is brought into engagement with the light-shielding door and is rotated to open and close the light-shielding door, and a driving force transmitting mechanism for opening and closing the light-shielding door which receives the driving force of said motor from a part of a film feed mechanism which is driven by said motor and transmits the driving force to the light-shielding door driving member only when the light-shielding door is to be closed or opened, said driving force transmitting mechanism comprises a sun gear which forms a part of the film feed mechanism, a planetary gear in mesh with the sun gear, a revolution limiting mechanism which selectively prevents and permits revolution of the sun gear and an engagement member which is actuated by rotation of the sun gear to be engaged with the light-shielding door opening and closing mechanism; and a control means which causes the light-shielding door opening and closing mechanism to open and close the light-shielding door under the driving force provided by the motor when the light-shielding lid is closed.

8. A photographic camera having a magazine chamber which is opened and closed by a light-shielding lid and in which is loaded a film magazine comprising a magazine body provided with a film exit slit and a light shielding door for opening and closing the film exit slit, said camera comprising:

means for feeding the film by rotating a spool on which the film is disposed;

means for opening the light-shielding door;

control means for, when the light-shielding door is closed, causing said feeding means to rotate the spool in a direction of winding up the film onto the spool and simultaneously opening the light-shielding door and, after said light-shielding door is opened, said control means causing the spool to rotate in a reverse direction to feed the film out of the film magazine.

9. A photographic camera as recited in claim 8, wherein said feeding means and said opening means comprise an electric motor that is used commonly by both said feeding means and said opening means.

10. A photographic camera having a magazine chamber which is opened and closed by a light-shielding lid and in which is loaded a film magazine comprising a magazine body provided with a film exit slit and a light-shielding door for opening and closing the film exit slit, said camera comprising:

a light-shielding door opening and closing mechanism which opens and closes the light-shielding door of the film magazine loaded in the magazine chamber;

an electric motor which is disposed in the camera;

a lifter which is driven by a drive force of said motor after the light-shielding lid is unlocked for lifting said film magazine from a loaded position in said magazine chamber to a removal position where said film magazine can be taken out of the chamber.

11. A photographic camera as defined in claim 10, further comprising means for unlocking said light-shielding lid after said light-shielding door of said film magazine is closed.

12. A photographic camera as defined in claim 10, further comprising:

a light-shielding door closing member engaged with said light-shielding door which closes the light-shielding door by the drive force of said motor;

a light-shielding lid locking member which locks said light-shielding lid when said light-shielding lid is closed, and releases a locked state of said light-shielding lid due to the force of said motor; and a drive power transmitting means which transmits said drive force to said light-shielding door closing member, then said light-shielding lid locking member, and then said lifter, in that order.

13. A photographic camera as defined in claim 10, wherein a lock releasing member is provided on a camera surface close to said light-shielding lid for unlocking said light-shielding lid, and said motor is driven in response to operation of said lock releasing member.

14. A photographic camera as defined in claim 12, wherein said drive power transmitting means has a gear which is provided with a pin, said gear transmitting said drive force to said lifter after transmitting the drive force to said light-shielding lid locking member.

15. A photographic camera as defined in claim 10, wherein said lifter comprises a plate like base portion extending substantially in parallel to a loading direction of said film magazine and a claw portion formed at the inside end of the base portion bent inward in the magazine chamber, said lifter being adapted to move along said loading direction so that said claw portion engages with said film magazine and lifts said film magazine to the removal position where said film magazine can be taken out of said magazine chamber.

16. A photographic camera as defined in claim 15, wherein said lifter returns inwardly to said magazine chamber after it moves to an outside of the chamber, and said camera further comprises a drop-preventing means projecting into the chamber to prevent said film cartridge from dropping into said magazine chamber after said lifter is returned.

17. A photographic camera as defined in claim 15, further comprising a control means which stops the drive of said motor in response to detection of returning of said lifter to the inside of said magazine chamber.

18. A photographic camera as defined in claim 10, wherein said electric motor is coupled to means for feeding the film.

* * * * *